United States Patent
Wilting

(10) Patent No.: US 7,124,961 B2
(45) Date of Patent: Oct. 24, 2006

(54) SPRAYER SYSTEM

(75) Inventor: Jaap Wilting, Zelhem (NL)

(73) Assignee: John Deere Farbriek Horst B.V., Horst (NL)

( * ) Notice: Subject to any disclaimer, the term of this patent is extended or adjusted under 35 U.S.C. 154(b) by 448 days.

(21) Appl. No.: 10/714,013

(22) Filed: Nov. 14, 2003

(65) Prior Publication Data

US 2004/0135003 A1 Jul. 15, 2004

(30) Foreign Application Priority Data

Dec. 13, 2002 (DE) .................. 102 58 217

(51) Int. Cl.
*B05B 9/00* (2006.01)
(52) U.S. Cl. ............... 239/124; 239/127; 239/159; 239/163; 239/172; 239/303; 239/310; 239/318; 239/550; 239/551; 239/106; 239/119
(58) Field of Classification Search ............. 239/76, 239/124, 127, 159, 163, 170, 172, 106, 119, 239/303, 310, 318, 407, 408, 433, 436, 443, 239/550, 551, 562
See application file for complete search history.

(56) References Cited

U.S. PATENT DOCUMENTS 4,121,767 A * 10/1978 Jensen .................. 239/124
4,503,915 A * 3/1985 Gagliardo et al. .......... 239/310
5,556,033 A * 9/1996 Nachtman .................. 239/127
6,056,210 A * 5/2000 Weddle ....................... 239/159

FOREIGN PATENT DOCUMENTS

| DE | 3401 734 A1 | 8/1985 |
|---|---|---|
| DE | 35 37 082 C2 | 4/1987 |
| DE | 44 20 128 A1 | 12/1995 |
| EP | 0 820 224 B1 | 1/1998 |
| EP | 1 240 826 A2 | 9/2002 |
| FR | 2 555 469 | 11/1983 |
| FR | 2 616 084 | 6/1987 |
| FR | 2 678 181 A1 | 12/1992 |

OTHER PUBLICATIONS

Leaflet of AMAZONE MI 126/S233 (D) 04.02; Date Unknown; 2 Pages.

* cited by examiner

Primary Examiner—Steven J. Ganey

(57) ABSTRACT

A sprayer system includes one or more spray nozzle systems and a recirculation line which contains a Venturi for recirculation of non-sprayed liquid into a tank during breaks in spraying. To facilitate circulation, restrictors are placed in an upstream area of each nozzle system feeding line, and a downstream control valve is inserted between each nozzle system and the recirculation line. Each nozzle system can be independently controlled. Closing a control valve activates the spraying system associated with that valve, whereas opening the valve enables the liquid to circulate through the recirculation line into the tank to prevent unwanted dripping, demixing and depositing.

10 Claims, 1 Drawing Sheet

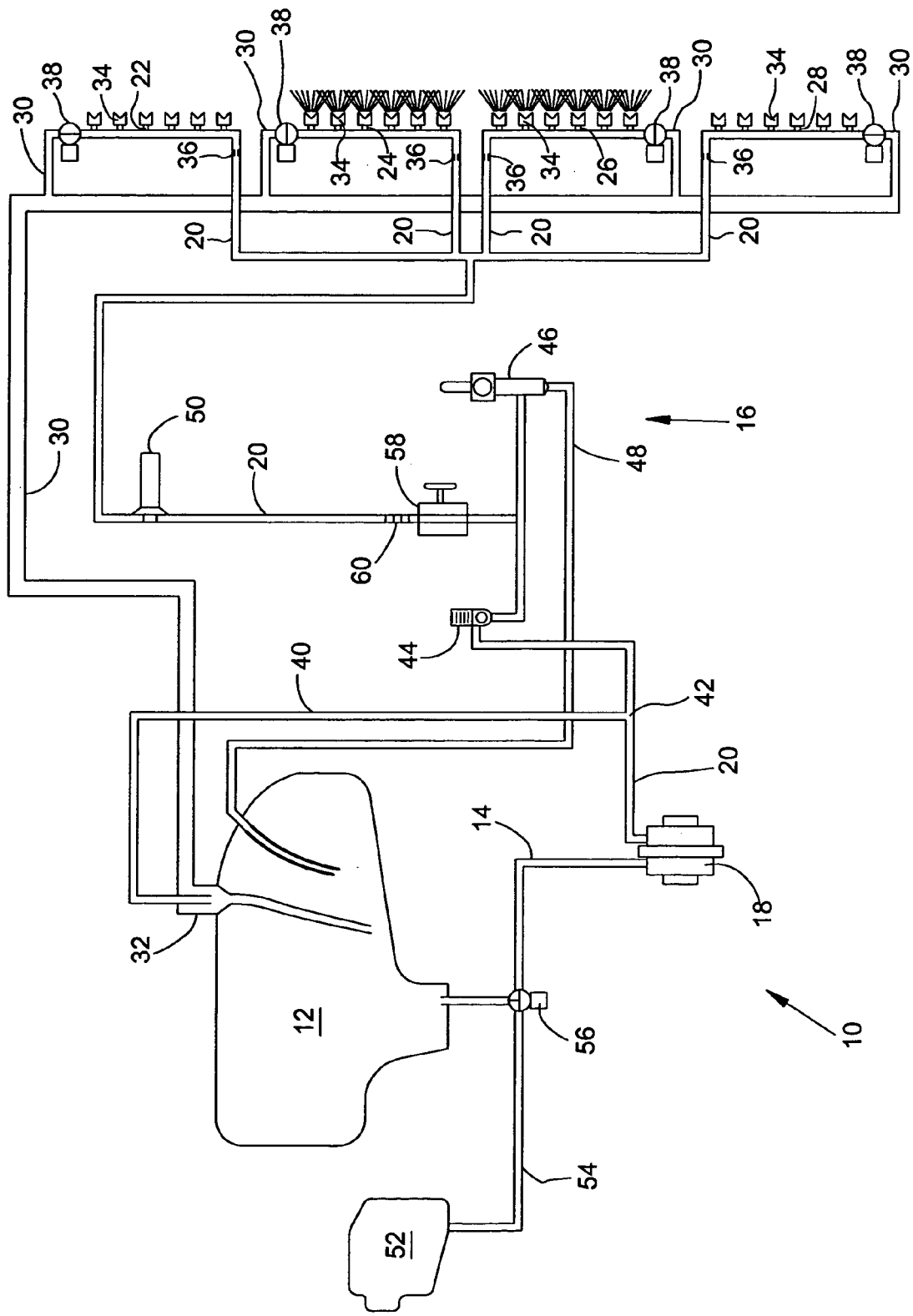

SPRAYER SYSTEM

FIELD OF THE INVENTION

The present invention relates to a sprayer system with a tank, a pump, a feed line, at least one spray nozzle system, a recirculation line and structure for generating a partial vacuum in the recirculation line.

BACKGROUND OF THE INVENTION

Sprayer systems with different designs are used in agriculture during treatment of grain to distribute liquids or mixtures, such as pesticides, herbicides, fertilizers or other liquid chemicals. One problem with many designs is that the liquid to be sprayed or distributed must be agitated or always kept in motion by flow so that demixing or deposits do not occur in the sprayer system. Demixing and deposits can cause clogging of the sprayer system and nonuniform concentration of the liquid or mixture.

Prior art attempts to overcome demixing and deposits typically include circulation systems wherein the liquid being sprayed is circulated, especially during interruptions in the spraying operation or sectional operations, so that continuous liquid movement is present in all lines of the sprayer system. Such systems often have separately controlled spray nozzles, such as pneumatically or electrically flow interrupting spray nozzles to avoid output of spray liquid at the spray nozzles when the liquid must be passed by the nozzles for circulation. Such spray nozzle systems, however, require much maintenance and attention and are costly.

A circulation system is disclosed, for example, in DE 34 01 734, in which a spray device contains a recirculation line wherein the liquid being sprayed is kept in continuous circulation. A shortcoming with such a system is that circulation no longer occurs during interruptions in spraying, and deposits can occur in the liquid remaining in the sprayer system.

The spraying machine disclosed in FR 2 678 181 is representative of another type of system in which liquid circulation can be produced using a recirculation line and a control valve located in the recirculation line. In this type, liquid circulation is provided by opening the control valve when the spray operation is discontinued or interrupted. A shortcoming of such a system is that no liquid circulation is made possible during the spray operation, so that liquid remaining in the recirculation line can experience precipitation and demixing. In addition, the spray nozzles cannot be operated separately from each other to permit sectional operation.

A sprayer system is also disclosed in a brochure of the Amazone company with the masthead MI 126/S 233 (D) 04.02, referred to as a pressure circulation system (PCS) for towed field spraying. In this system, circulation is implemented by reversal of the flow direction, wherein a three way valve is contained between a feed line, a recirculation line and a spray nozzle system. The spray nozzle system is designed as a circulation line, and the direction of flow in the spray nozzle system can be reversed by controlling the three way valve. A drawback with the PCS type of system is that during spray operation, no liquid movement occurs in a portion of the spray nozzle system circulation line, and particles can deposit in this portion. In addition, this system requires additional hardware which increases maintenance requirements and expense.

EP 820 224 B1 discloses another type of spraying machine that permits circulation of the liquid during interruption in spraying via recirculation line structure provided with partial vacuum and a feed line in addition to the main feed line. A drawback with this type of machine is that, during spraying with sectional operation, the liquid remaining in the recirculation line and the additional feed line does not circulate since a vacuum can only be generated during an interruption in spraying.

The problem to be solved by the invention is seen in the fact that the known sprayer systems are demanding and costly and/or permit no circulation of the spray liquid during an interruption in spraying or sectional operation.

SUMMARY OF THE INVENTION

According to the present invention, a sprayer system of the type discussed above with a recirculation line is provided. The line feeds a liquid that has not been sprayed from the spray nozzles, for example, during an interruption in spraying or during sectional spraying, back into the supply tank with a partial vacuum or suction pressure. Feed lines that convey the medium being sprayed to one or more spray nozzle systems are each provided with a throttle device, and a control valve is arranged between the spray nozzle system and the recirculation line. By closing the control valve, the liquid in the spray nozzle system backs up and emerges through the spray nozzles. By opening the control valve, access to the recirculation line is unblocked and the partial vacuum prevailing in the recirculation line propagates through the spray nozzle system, or also to the feed line up to the throttling site in the feed line. Liquid output at the spray nozzles is interrupted by the partial vacuum, and the liquid is fed into the tank or supply vessel through the recirculation line. In sprayers with several spray nozzle systems, each having several spray nozzles through which differently positioned sections are formed on the spray linkages, sectional operation can be implemented in simple fashion. The control valves, which simultaneously serve as sectional valves, are opened or closed differently. High pressure liquid conveyed into the feed line emerges from the spray nozzles in the section with closed control valve, whereas the liquid in the section with opened control valves is conveyed back to the recirculation line and therefore circulated. If the control valves of all sections are opened, interruption of spraying occurs and the entire sprayer system liquid is recirculated. Therefore, during an interruption in spraying and during sectional operation of a spraying system, no demixing and/or depositing occur in the spray lines. The partial vacuum that builds up during opening of the control valves also prevents dripping and undesired emergence of spray liquid from the nozzles. If all the sections are engaged, i.e., all spray nozzle systems are activated and all control valves allocated to the sections are closed, no circulation occurs in the recirculation line. However, this has no significance on the subsequent spraying process on reengagement of one or more spray nozzle systems, since any demixing or deposits that occur cannot reach the region of the spray nozzles. Any demixed or deposits can be flushed through the recirculation line by a brief disengagement of a section.

An injector or Venturi device preferably serves as means to generate a partial vacuum. Such components, which are state of the art and driven with a liquid stream, generate a partial vacuum on their suction side which can be used to convey liquid.

The injector according to the invention is operated by the same pump that conveys the spray liquid, or the injector can be operated by the liquid conveyed by the pump. For this purpose, a bypass line is connected directly to the injector from the feed line. The pump has sufficiently high pump output to convey the liquid from the tank to the spray nozzle systems or sections and to simultaneously supply the injector that feeds the liquid back into the tank through the recirculation line. The injector is preferably positioned directly on the tank so that the liquid operating the injector is flushed directly back into the tank along the shortest path.

The throttling device arranged in the feed line of the spray nozzle system is laid out so that the passage cross section or outlet cross section of the throttling device has at least the same size as the entire outlet cross section of the corresponding spray nozzle system. To generate or maintain the partial vacuum required for a suction effect on the outlet or spray nozzles of the spray nozzle system, the throttle device must be adapted to the number and outlet cross section of the spray nozzles connected to the spray nozzle system. If the outlet cross section or passage cross section of the throttle device is too large, the pressure gradient would not be sufficient to close the spray nozzles provided with an anti drip membrane. If the passage cross section is too small, the required spray pressure cannot be applied to unload the spray nozzles.

According to the invention, several spray nozzle systems or sections can be connected to the system. In addition to the design layout of the spraying equipment and the spray linkages, the outputs of the pump and injector can be selected for proper operation of several spray nozzle systems or sections, which can be connected in parallel to a feed line by a corresponding distribution site. A separate throttle device is connected in front of each section and a control valve for parallel connection to a recirculation line is connected downstream of the throttle device. The different spray nozzle systems or sections can be engaged and disengaged independently of each other by controlling the control valve. Liquid is sprayed with the engaged spray nozzle systems, and liquid is simultaneously circulated through the disengaged spray nozzle systems and through the recirculation line.

In order to generate sufficiently high partial vacuum in a recirculation line, the injector is exposed to a higher operational pressure than the feed lines. For this purpose, a pressure regulator or primary pressure regulator is used, which is preferably arranged between the bypass line to the injector and the spray nozzle system and provides a lower pressure than generated by the pump. Another pressure regulator or operating pressure regulator is preferably arranged between the first pressure regulator and the spray nozzle system and permits regulation of the operating pressure for spraying of the liquid. Therefore the pressure in the injector line and in the feed line can be regulated independently of each other.

Any conventional throttle device, such as a simple feed line constriction, can be used for throttling of the liquid in the feed line for pressure reduction on the spray nozzle system. However, other devices such as a flow rate reducing valve or diaphragm arranged between the feed line or introduced into the feed line can be used. In a preferred embodiment of the invention, variable throttle devices are used to provide a simple adaptation of the throttle device to a change in spray nozzles.

In another embodiment of the invention, the sprayer system is provided with a device that facilitates blocking of inflow into the feed line and, at the same time, initiates venting. By appropriate arrangement of this device, for example, between the bypass line of the injector and the spray nozzle system, most of the lines of the sprayer system can be emptied by the partial vacuum produced by the injector and all the liquid remaining in the lines fed back to the tank after a cleaning process or spray process.

The invention, as well as additional advantages and advantageous modifications and embodiments of the invention, are further described and explained below, with reference to the drawing, which shows an application example of the invention.

BRIEF DESCRIPTION OF THE DRAWINGS

The single drawing FIGURE shows a schematic of a sprayer system according to the invention, with several spray nozzle systems or sections arranged in parallel.

DESCRIPTION OF THE PREFERRED EMBODIMENT

As depicted in the FIGURE, a sprayer system 10 includes a tank 12 for liquid being sprayed and a supply line 14 connected to a spraying system 16 through a pump 18.

The spraying system 16 includes a feed line 20 connected to the input side of spray nozzle systems 22, 24, 26, 28. Four spray nozzle systems 22, 24, 26, 28 are shown in the FIGURE, but the present invention may be utilized with more or less nozzle systems. The spray nozzle systems 22, 24, 26, 28 have output sides connected to a recirculation line 30 which, in turn, is connected at a remote end away from the spray nozzle systems 22, 24, 26, 28 to an intake side of an injector 32.

The spray nozzle systems 22, 24, 26, 28 are provided with several spray nozzles 34 that are preferably each equipped with a conventional anti-drip membrane (not shown) which opens the spray nozzle 34 by application of a spray pressure and closes the spray nozzle 34 by application of a suction pressure.

The spray nozzle systems 22, 24, 26, 28 each have an input side connected to a throttle device 36 so that the liquid conveyed through the feed line 20 experiences a pressure drop. A simple orifice in the feed line 20 of the corresponding spray nozzle systems 22, 24, 26, 28 is preferably introduced as the throttle device 36. The passage cross section of each orifice is at least equal to the sum of the outlet cross sections of the spray nozzles 34 on the corresponding spray nozzle system 22, 24, 26, 28. The passage cross section for each spray nozzle 34 is preferably slightly greater than the sum of the outlet cross sections of the spray nozzles 34 on the respective spray nozzle system 22, 24, 26, 28. In the embodiment depicted in the figure, the corresponding spray nozzle systems 22, 24, 26, 28 are provided with the same number of spray nozzles 34, all of which have an outlet cross section of the same size, so that the depicted throttle device 36 also has the same passage cross section. For the case in which the respective spray nozzle systems 22, 24, 26, 28 have a different number of spray nozzles 34, the throttle devices 36 must be adapted accordingly in their passage cross sections to the total outlet cross section of the respective spray nozzle system 22, 24, 26, 28. The throttle devices 36 must be similarly adapted when the respective spray nozzle systems 22, 24, 26, 28 contain spray nozzles 34 with different outlet cross sections.

A control valve 38 such as a simple check valve is arranged on the output side between the spray nozzle systems 22, 24, 26, 28 and the recirculation line 30. The spray nozzle systems 22, 24, 26, 28 can be operated independently of each other by selectively closing and opening control valves 38, as described further below.

The injector 32 includes an input connected to a bypass line 40. The bypass line 40 extends from a location 42 at the line 20 directly to the injector 32, which is operated by the liquid conveyed by pump 18. The injector 32 is arranged so that the liquid flows directly into the tank 12 after passing through injector 32.

The operating pressure of the injector 32 is higher than the injection pressure of the liquid which reaches the spray nozzles 34. In order to regulate both the injector operating pressure and the spray pressure at the nozzles 34, a primary pressure regulator 44 and a spray pressure regulator 46 are located in the feed line 20. For pressure regulation with the spray pressure regulator 46, a pressure equalization line 48 located between the regulator 46 and the tank 12 feeds excess liquid back into tank 12. Pressure to the injector 32 is reduced to a desired injector operating pressure is reduced from pump output pressure by the primary pressure regulator 44. The liquid flowing through the bypass line 40 flows through the injector 32 at an injector operating pressure adjusted in dependence on the partial vacuum to be generated on the injector 32 or with an injector operating pressure adjusted through the injector 32. In the embodiment shown, an injector operating pressure of about 8 bar is preferably generated.

After flowing through the primary pressure regulator 44, the liquid in the line 20 is throttled or compensated to a stipulated value by the spray pressure regulator 46. Therefore, spray pressure of liquid directed to the spray nozzle systems 22, 24, 26, 28 can be regulated with the spray pressure regulator 46. Before reaching the spray nozzle systems 22, 24, 26, 28, the liquid is passed through a filter 50 that protects the spray nozzle systems 22, 24, 26, 28 from contamination. The liquid bled off during pressure compensation by the spray pressure regulator 46 is fed to the tank 12 through the pressure compensation line 48.

Liquid circulation in the application example depicted in the FIGURE is as follows. The liquid to be sprayed, situated in tank 12, is conveyed through the feed line 20 under primary pressure via supply line 14 by means of pump 18. Part of the liquid is fed at injector operating pressure through the bypass line 40 to injector 32 and generates a partial vacuum on the suction side of the injector 32 which is connected to the circulation line 30. The partial vacuum propagates through the recirculation line 30 to the spray nozzle systems 22, 24, 26, 28. The liquid flowing through the injector 32 is fed into the tank 12. The liquid remaining in feed line 20 past the location 42 is regulated to a lower spray pressure via spray pressure regulator 46 and passes through the filter 50 to the throttle sites provided with the throttle devices 36 before reaching the spray nozzle systems 22, 24, 26, 28. Depending on whether the control valves 38 are in open or closed positions, the liquid is either fed into recirculation line 30 or sprayed through spray nozzles 34.

The throttle devices 36 introduce a liquid pressure drop in the feed line 20. If a control valve 38 is in the closed position, access to the recirculation line 30 is blocked and the spray pressure builds up so that the liquid emerges from the spray nozzles 34. On the other hand, if a control valve 38 is in the opened position, access to the recirculation line 30 is unblocked and the partial vacuum present in the recirculation line 30 builds up to the throttle device 36, so that the corresponding spray nozzle system 22, 24, 26, 28 is exposed to a partial vacuum and the anti drip membranes close the spray nozzles 34. As a result of the partial vacuum prevailing in the recirculation line 30, liquid passed through the feed line 20 of the corresponding spray nozzle systems 22, 24, 26, 28 is conveyed via recirculation line 30 through the injector 32 into the tank 12, so that the liquid can circulate.

As an example, the control valves 38 of spray nozzle systems 22 and 28 are shown in the FIGURE in the opened position and the control valves 38 of the spray nozzle systems 24 and 26 are shown in the closed position. The partial vacuum prevailing in the recirculation line 30 consequently is present in spray nozzle systems 22 and 28, so that the spray nozzles 34 are closed and the liquid flowing through the throttle device 36 in spray nozzle systems 22 and 28 is conveyed and circulated via corresponding recirculation line 30 through the suction side of injector 32 into the tank 12. At the same time, the injection pressure prevailing in the feed line 20 in spray nozzle systems 24 and 26 is present, so that the spray nozzles 34 are opened and the liquid flowing through the throttle device 36 emerges or is sprayed from the spray nozzle systems 24 and 26. The respective spray nozzle systems 22, 24, 26, 28 can therefore be engaged or disengaged independently of each other by the corresponding control valves 38, so that only one of the spray nozzle systems 22, 24, 26, 28 can spray, or only one of the spray nozzle systems 22, 24, 26, 28 has closed spray nozzles 34. If all control valves 38 are opened, the liquid circulates through the recirculation line 30 without being sprayed through spray nozzle systems 22, 24, 26, 28. If all control valves 38 are closed, no circulation occurs through the recirculation line 30, so that the liquid conveyed through the feed line 20 is sprayed.

In addition to the tank 12 for the liquid being sprayed, a rinsing water tank 52 is connected to the supply line 14 via inlet 54 and a three way valve 56. To perform a cleaning process of the sprayer system 10, the feed line 14 is connected to inlet 54 by controlling the three way valve 56 so that rinse liquid is circulated in the liquid loop and the lines 20, 30, 40 are cleaned by the rinse liquid. It is also conceivable to fill tank 12 only with water and introduce the chemical additives via rinsing water tank 52 into sprayer system 10. A mixture of water with the chemical additives can then occur by appropriate circulation of the liquid.

In another modification, the sprayer system 10 is provided with a blocking device 58 that is combined with a venting device 60. The inlet of liquid into the feed line 20 can be interrupted by the blocking device 58 so that a partial vacuum propagates to the blocking device 58 when the control valves 38 are opened via recirculation line 30. The venting device 60 combined with the blocking device 58 permit the entire line system lying behind the blocking device 58 in the direction of feed to be emptied up to injector 32 or evacuated by means of a partial vacuum, with the liquid being conveyed to the tank 12 via recirculation line 30.

Even if the invention was only described with reference to the application examples, in light of the aforementioned description and drawing, many different alternatives, modifications and variants that fall under the present invention are apparent to one skilled in the art. The sprayer system 10, for example, can be additionally equipped with flow meters that measure both the flow rate in the recirculation line 30 and the flow rate in the feed line 20, and precisely determine the sprayed amount of liquid based on the difference in rates. In addition, conventional systems such as cleaning nozzles in the tank or circulation systems, that in addition to operating in connection with pump 18, operate using an additional pump to clean the tank 12 or to circulate the tank contents. Additional tanks or containers can also be connected to the piping system which operate in a similar fashion to that described above to feeding material through the system.

The invention claimed is:

1. A sprayer system with a tank containing a spray fluid, a pump for generating a spray pressure, a feed line, at least one spray nozzle system, a recirculation line and vacuum structure connected to the recirculation line and generating a partial vacuum in recirculation line, a throttle device located in the feed line, and a control valve located between at least one spray nozzle system and the recirculation line, the control valve having a closed position wherein the spray pressure generated by the pump is applied to at least one spray nozzle system, and the control valve having an open position wherein the partial vacuum generated in the recirculation line is applied to at least one spray nozzle system, wherein the vacuum structure comprises an injector, and including an injector line connected between the feed line and the injector and providing pressurized spray fluid to the injector to generate the partial vacuum.

2. The sprayer system according to claim 1 wherein said at least one spray nozzle system includes two or more spray nozzle systems connected in parallel to the feed line and the recirculation line.

3. The sprayer system according to claim 1 including pressure regulator structure located in the feed line, wherein the pressure in the injector line can be varied relative to the pressure in the feed line.

4. The sprayer system according claim 1 wherein the throttle device comprises a constriction in the feed line.

5. The sprayer system according to claim 1 wherein the throttle device comprises an orifice located in the feed line.

6. The sprayer system according to claim 1 wherein the throttle device comprises a variable orifice for adapting the throttle device to a change in the spray nozzle system.

7. A sprayer system with a tank containing a spray fluid, a pump for generating a spray pressure, a feed line, at least one spray nozzle system, a recirculation line and vacuum structure connected to the recirculation line and generating a partial vacuum in recirculation line, a throttle device located in the feed line, and a control valve located between at least one spray nozzle system and the recirculation line, the control valve having a closed position wherein the spray pressure generated by the pump is applied to at least one spray nozzle system, and the control valve having an open position wherein the partial vacuum generated in the recirculation line is applied to at least one spray nozzle system, and wherein the throttle device has an outlet with an outlet cross section that is greater than or equal to an outlet cross section of the at least one spray nozzle system.

8. The sprayer system according to claim 7, wherein the vacuum structure comprises an injector.

9. The sprayer system according to claim 8, including an injector line connected between the feed line and the injector and providing pressurized spray fluid to the injector to generate the partial vacuum.

10. A sprayer system with a tank containing a spray fluid, a pump for generating a spray pressure, a feed line, at least one spray nozzle system, a recirculation line and vacuum structure connected to the recirculation line and generating a partial vacuum in recirculation line, a throttle device located in the feed line, and a control valve located between at least one spray nozzle system and the recirculation line, the control valve having a closed position wherein the spray pressure generated by the pump is applied to at least one spray nozzle system, and the control valve having an open position wherein the partial vacuum generated in the recirculation line is applied to at least one spray nozzle system, wherein said at least one spray nozzle system includes two or more spray nozzle systems connected in parallel to the feed line and the recirculation line, and wherein each spray nozzle system includes a throttle device and a control valve for selectively applying a spray pressure or partial vacuum to the spray nozzle systems independently of each other.

* * * * *